United States Patent
Takashi

[11] Patent Number: 5,946,436
[45] Date of Patent: Aug. 31, 1999

[54] STRUCTURE OF OPTICAL CONNECTOR AND ALIGNING METHOD

[75] Inventor: Syuichi Takashi, Kamagaya, Japan

[73] Assignee: Seikoh Giken Co., Ltd., Matsudo, Japan

[21] Appl. No.: 08/972,481

[22] Filed: Nov. 18, 1997

[30] Foreign Application Priority Data

Jul. 22, 1997 [JP] Japan .................................. 9-212537

[51] Int. Cl.⁶ ..................................................... G02B 6/38
[52] U.S. Cl. ............................. 385/60; 385/67; 385/70; 385/72
[58] Field of Search ................................ 385/55, 56, 58, 385/60, 67, 70, 72

[56] References Cited

U.S. PATENT DOCUMENTS

| | | | |
|---|---|---|---|
| 4,744,621 | 5/1988 | Tanabe et al. | 385/84 |
| 4,747,659 | 5/1988 | Takahashi | 385/67 |
| 5,212,752 | 5/1993 | Stephenson et al. | 385/78 |
| 5,222,169 | 6/1993 | Chang et al. | 385/87 |
| 5,428,703 | 6/1995 | Lee | 385/78 |
| 5,436,994 | 7/1995 | Ott et al. | 385/86 |
| 5,633,970 | 5/1997 | Olson et al. | 385/78 |
| 5,809,192 | 9/1998 | Manning et al. | 385/78 |

*Primary Examiner*—John D. Lee
*Assistant Examiner*—Juliana K. Kang
*Attorney, Agent, or Firm*—Venable; Robert J. Frank; Gabor J. Kelemen

[57] ABSTRACT

The invention provides a structure of an optical connector and an aligning method which are capable of easily accomplishing the alignment between optical fibers without pre-alignment before the assembling of the optical connector and disassembling of an optical connector assembly. A tube base fixed to a ferrule body has a plurality of fitting portions and a plurality of notch portions on its outer circumferential surface. The axial length A1 of the fitting portions is set to be shorter than the separation B between an end surface of a holder and an end surface of projecting portions of an optical connector housing. At the alignment, the ferrule body is pressed against a spring to be retreated. In this state, the fitting portions can pass in the separation B to allow the ferrule body to rotate. When releasing from the pressing against the spring, at that rotational position the ferrule body is returned by the restoring force of the spring so that the fitting portions again come into the engaged condition.

15 Claims, 7 Drawing Sheets

PRIOR ART

FIG. 4

PRIOR ART

PRIOR ART

FIG. 6B

PRIOR ART

STRUCTURE OF OPTICAL CONNECTOR AND ALIGNING METHOD

BACKGROUND OF THE INVENTION

1. Field of the Invention The present invention relates to a structure of an optical connector and an aligning method for obtaining coincidence between the optical axes of optical fibers to be coupled to each other.

2. Description of the Related Art Referring first to FIGS. 3 to 6, a description will be made hereinbelow of a structure of a prior optical connector assembly made by the present assignee of this application.

Figure 3:
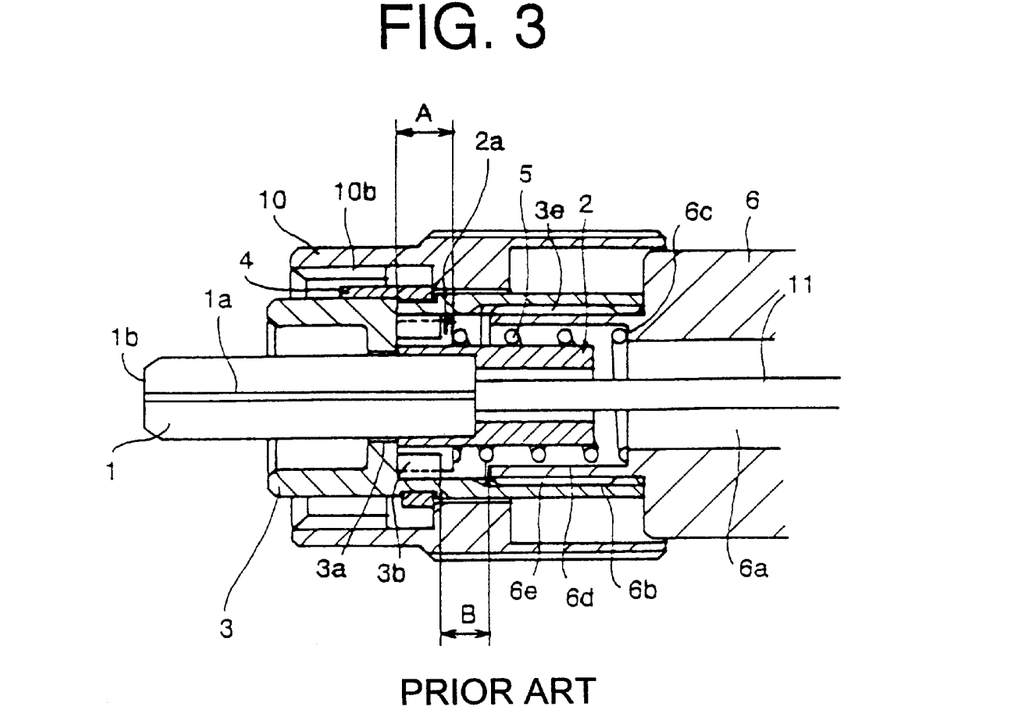
FIG. 3 is a cross-sectional view showing a conventional optical connector assembly.
Figure 4:
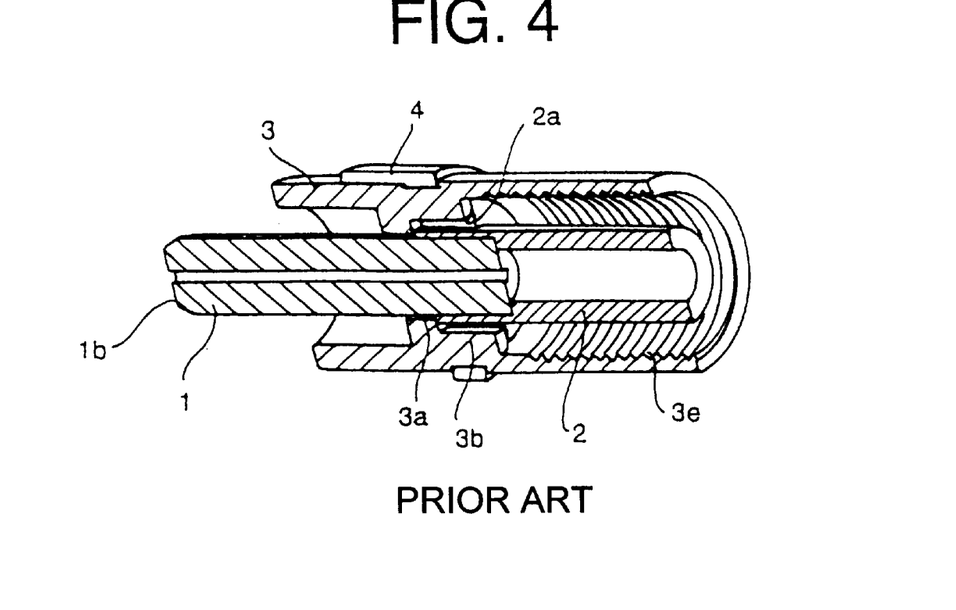
FIG. 4 is an illustration for describing a fitting structure of a tube base fixed to a ferrule body and an optical connector housing.
Figure 5A:
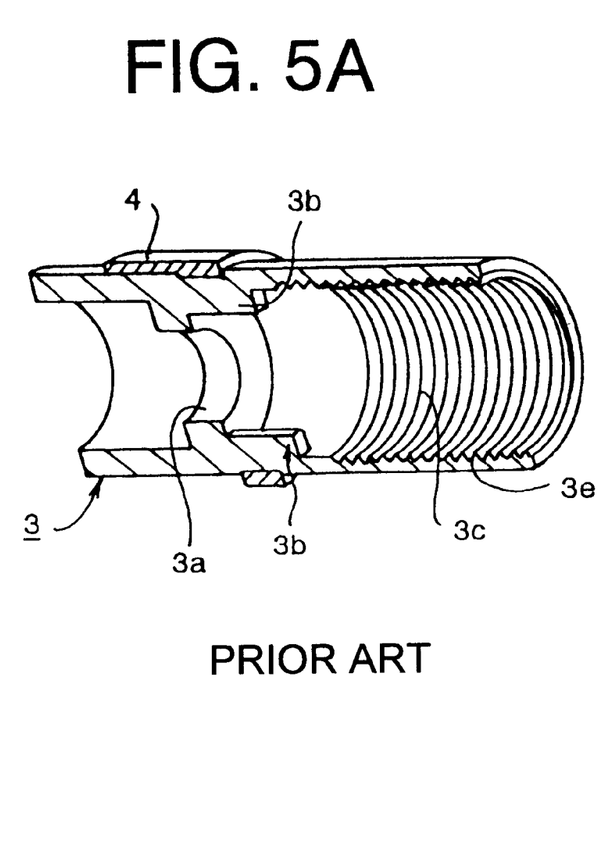
FIG. 5A is a perspective view showing a conventional optical connector housing cut vertically.
Figure 5B:
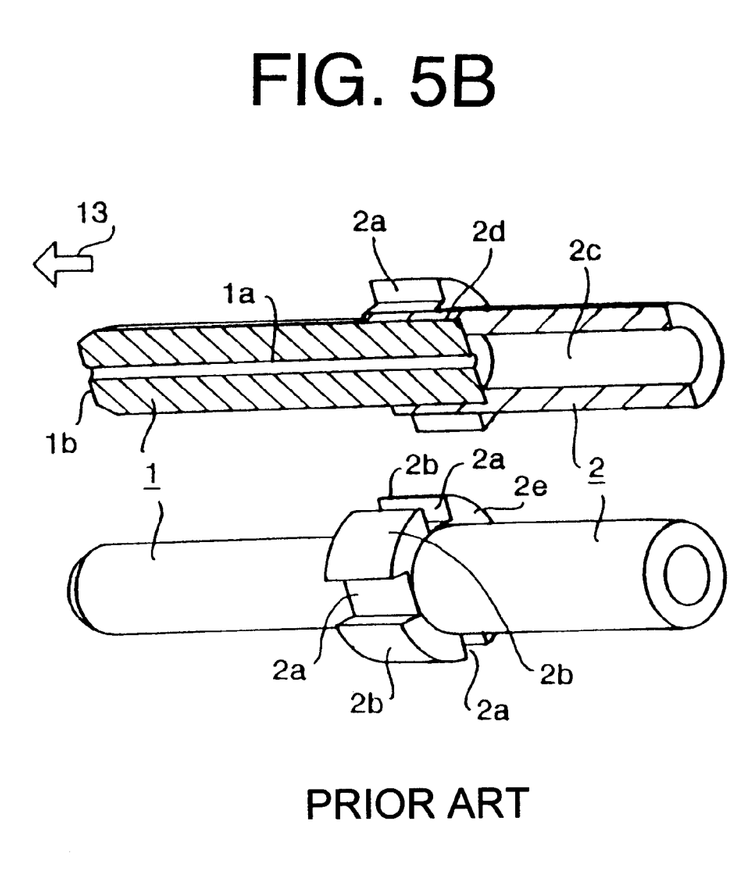
FIG. 5B is a perspective view showing a conventional tube base fixed to a ferrule body.
Figure 6A:
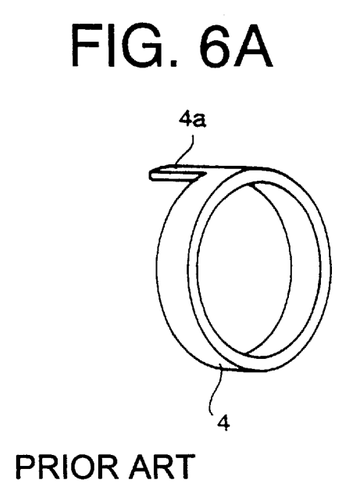
FIGS. 6A and 6B are illustrations of an optical connector housing and a key.
Figure 6B:
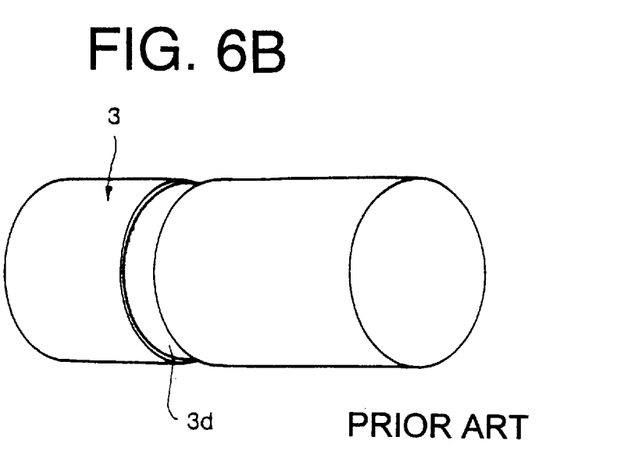

FIG. 3 is a cross-sectional view showing the optical connector assembly, FIG. 4 is an illustration useful for explaining a fitting structure of a tube base fixed to a ferrule body and an optical connector housing, FIG. 5A is a perspective view showing the optical connector housing cut vertically, FIG. 5B is a perspective view showing the tube base fixed to the ferrule body, and FIGS. 6A and 6B are perspective views showing the optical connector housing and a key.

As shown in FIG. 5B, a tube base 2 has a cylindrical configuration and a portion 2d of an inner diameter of a hollow section 2c is formed to have a dimension slightly smaller than an outer diameter of a ferrule body 1. Further, a plurality of notch portions 2a and a plurality of fitting portions 2b are formed on an outer circumferential portion of the tube base 2.

The ferrule body 1 is fitted in the aforesaid inner-diameter portion 2d under pressure.

The ferrule body 1 has, at its central portion, an elongated small hole 1a for accepting and holding an optical fiber, and a clad portion of the optical fiber is inserted into this small hole 1a and fixed through an adhesive thereonto.

As shown in FIG. 5A, the optical connector housing 3 has a hollow section 3c having an inner diameter larger than the outer diameter of the tube base 2 and further has, in its bottom surface, a through hole 3a larger than the outer diameter of the ferrule body 1. In addition, on an inner circumferential surface of the hollow section 3c, one or more projecting portions 3b to be fitted in the notch portions 2a made in the outer circumferential portion of the tube base 2 are formed connectively with the through hole 3a. Moreover, a screw thread 3e is made in an inner circumferential surface of the hollow section 3c. Further, as shown in FIG. 6B, a circumferential groove 3d is made in an outer circumferential portion of the optical connector housing 3, and a key 4 with a tongue portion 4a shown in FIG. 6A is fixedly fitted over the circumferential groove 3d.

A holder 6 to be screwed into the optical connector housing 3 has a hollow section 6a with an inner diameter larger than an outer diameter of an optical fiber sheath 11 and further has, at its end portion, a coupling hole 6d with an inner diameter larger than an outer diameter of a spring 5, with a step portion 6c being formed between the coupling hole 6d and the hollow section 6a. A screw thread 6e is made on an outer circumferential portion of the holder 6.

In assembling, the ferrule body 1 is inserted into the optical connector housing 3 in a direction indicated by an arrow 13 in FIG. 5B, and the notch portions 2a of the tube base 2, fixed to the ferrule body 1, are engaged with the projecting portions 3b formed on a case section bottom surface. Whereupon, as shown in FIG. 4, an optical fiber end surface 1b of the ferrule body 1 protrudes from the through hole 3a in the case section bottom surface to the exterior of the optical connector housing 3.

As shown in FIG. 3, over the outer circumferential portion of the tube base 2 there is fitted the spring 5 having an outer diameter smaller than an inner diameter of the coupling hole 6d of the holder 6. One end portion of the spring 5 is placed against rear end surfaces 2e of the projecting portions 2b of the tube base 2, and in a manner that the screw thread 3e of the optical connector housing 3 is engaged with the screw thread 6e of the holder 6, the other end portion of the spring 5 hits against the step portion 6c of the holder 6.

Furthermore, a housing cover 10 having a screw thread 10b in its inner circumferential portion is set on the optical connector housing 3, thereby completing the optical connector assembly.

Figure 7A:
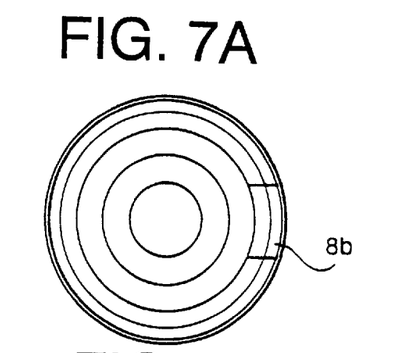
FIG. 7A is a side elevational view showing an adapter housing.
Figure 7B:
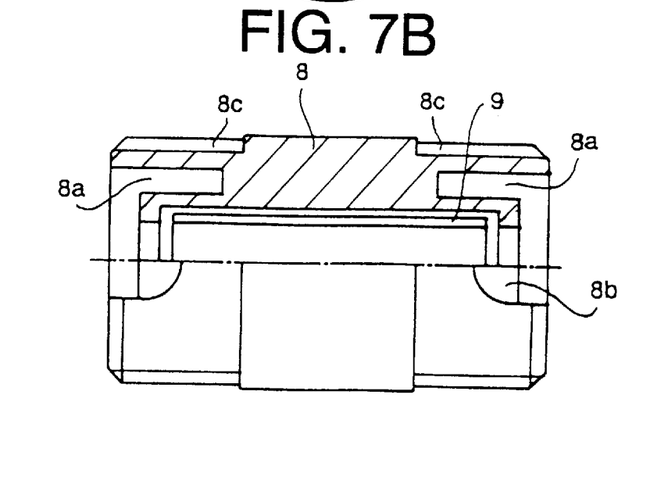
FIG. 7B is a cross-sectional view showing the same adapter housing.
Figure 8A:
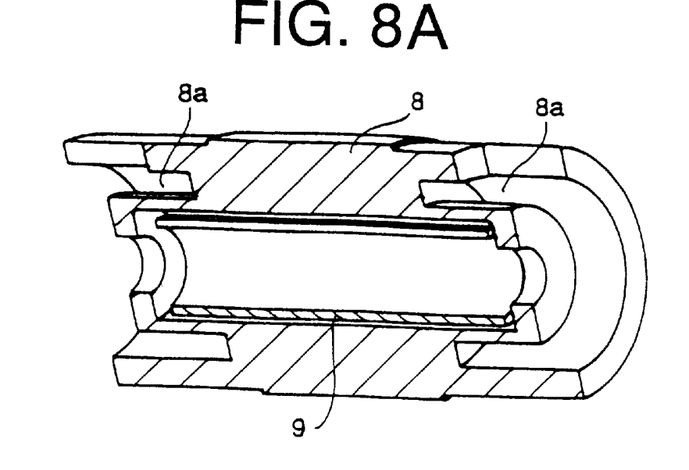
FIG. 8A is a perspective view showing an adapter housing cut vertically.
Figure 8B:
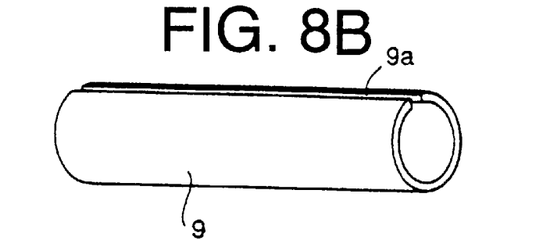
FIG. 8B is a perspective view showing a sleeve.

Secondly, using an adapter housing, a description will be made hereinbelow of a coupling structure of the aforesaid optical connector assembly. FIG. 7A is a side elevational view showing an adapter housing, FIG. 7B is a cross-sectional view thereof, FIG. 8A is a perspective view showing the adapter housing vertically cut, FIG. 8B is a perspective view showing a sleeve, FIG. 9 is a front elevational view available for describing the coupling structure of the optical connector assembly based upon the adapter housing, and FIG. 10 is an illustration for describing a method of making the coincidence between the axes of end surfaces of ferrule bodies within the adapter housing.

As shown in FIGS. 7A, 7B, 8A and 8B, an adapter housing 8 has, at its both end portions, circular tube grooves 8a each accepting the tip portion of the optical connector housing 3 and further has coupling grooves 8b each accepting the tongue portion 4a of the key 4. Further, it has, on its outer circumferential portion, screws thread 8c each engaged with the housing cover 10. In addition, it accepts, in its interior, a cylindrical sleeve (made of a metal or a zirconia ceramic) 9 having a cut section 9a at its central portion.

Figure 9:
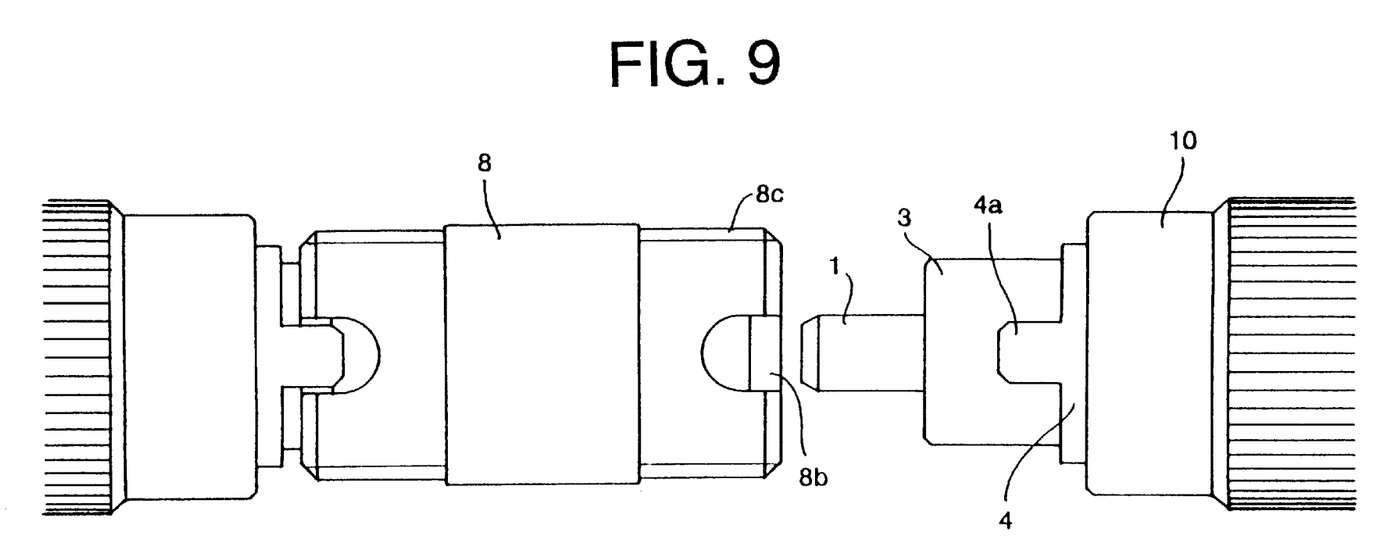
FIG. 9 is a front elevational view for explaining a coupling structure of an optical connector assembly based upon an adapter housing.

For the connection of the optical connector assembly, as shown in FIG. 9, the ferrule bodies 1 of the optical connector assemblies are respectively inserted from both sides into the adapter housing 8. The ferrule body 1 enters the sleeve 9, and the tongue portion 4a of the key 4 is fitted in the coupling groove 8b. In this case, the exit side end surfaces 1b of the ferrule bodies 1 are placed into contact with each other. Further, the screws thread 10b of the housing covers 10 are respectively tightly engaged with the screws thread 8c of the adapter housing 8, thus completing the connection.

Figure 10:
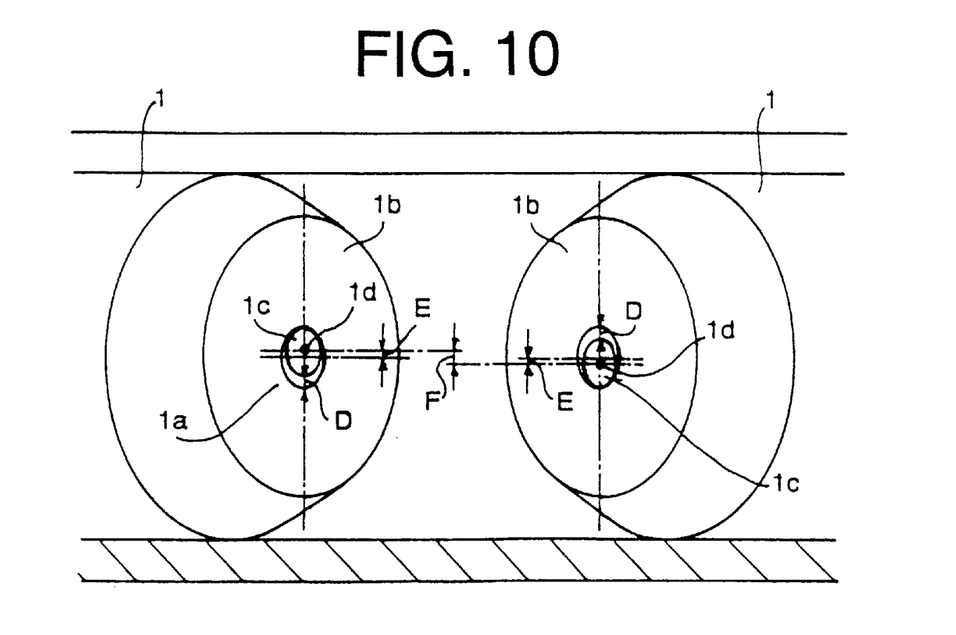
FIG. 10 is an illustration for describing a method of making the coincidence between the axes of ferrule body end surfaces within an adapter housing.

At this time, a gap occurs because of a difference between the center of the small hole 1a being at the central portion of the ferrule body 1 and the center of the outer diameter of the ferrule body 1 or a difference between the inner diameter of the small hole 1a and the outer diameter of the clad of the optical fiber, whereupon an axial slippage E occurs between the center of a core portion 1d and the center of the outer diameter of the ferrule body 1 as shown in FIG. 10. Owing to this axial slippage E, if the ferrule bodies 1 are aligned with each other on the basis of their outer diameters through the use of the sleeve 9 housed in the adapter housing 8, the difference in position between the centers of the core portions 1d of the optical fibers being in opposed relation to each other comes to a maximum in the case that the slippage occurs in the opposite directions. Therefore, the positional difference F between the core portions 1d of the optical fibers being in opposed relation to each other becomes a maximum of 2E, so that the optical loss increases at the connecting point.

For eliminating this problem, in the prior art, the axial slippage E directions of the two optical connector assemblies to be joined to each other are coincided with each other with reference to the keys 4 of the optical connector housings 3 to be connected to each other, thereby minimizing the positional difference F between the core portions. In this way, the aligning work is done to reduce the optical loss at the connecting point.

In the case of the prior optical connector assemblies, after the assembling the ferrule body 1 protruding from the optical connector housing 3 can not freely rotate with respect to the key 4 of the optical connector housing 3 because the notch portions 2a made on the fixed tube base 2 are engaged with the projecting portions 3b made on the inner circumferential surface of the optical connector housing 3. Accordingly, for achieving the minimum optical loss, the key 4 of the optical connector housing 3 is made as a separate detachable part, and detached from the assembly and again attached thereto in a state where its attaching position is changed in the rotating direction. For a proper connection, this work is repeatedly done.

However, in the case of this aligning method, in addition to taking a long time, the abrasion powders of the optical connector housings and the keys generated when detaching the key sections stick to the optical fiber end surfaces of the ferrule bodies, which are cut and damaged to deteriorate their optical characteristics.

Another aligning method has been as follows.

The exit side end surface 1b of the ferrule body 1 for fixing the tube base 2 is polished before being built in the optical connector housing 3. The sleeve 9 is used without being accommodated in the adapter housing 8, and the ferrule bodies being in the opposed relation to each other are connected to each other, and they are rotated while measuring the optical loss, thereby taking the optimal position. In addition, they are inserted into the optical connector housing 3 in a state with keeping this condition, and the spring 5 is inserted thereinto and then the optical connector housing 3 is sealed with the holder 6. The alignment is accomplished by this method.

However, according to this aligning method, since the ferrule body is directly inserted into the sleeve not accommodated in the adapter housing, difficulty is encountered to straightly apply the pressing force in the direction of the axis of the ferrule body. For this reason, the sleeve receives a bending force and, hence, deforms, which produces a positional difference between the center positions of the fibers being in an opposed condition. This causes difficulty of sure alignment.

In addition, for the production of connectors with optical fibers laid for optical connector connections, it is necessary that the abrasion, alignment and assembling of optical connectors are done at the laying place or that the ferrule body sections of the optical connectors polished at a factory or the like are conveyed in a state of being not built in the spring, the optical connector housings and holders and the assembling and alignment are made at the laying place.

SUMMARY OF THE INVENTION

Accordingly, it is an object of the present invention to provide a structure of an optical connector and an aligning method which are capable of easily achieving the alignment of optical fibers without the need for the prealignment before the assembling of the optical connectors and the need for the disassembling of the optical connector assembly.

For the elimination of the aforesaid problems, in accordance with the present invention, a structure of an optical connector comprises a ferrule body having a small hole for allowing the insertion of an optical fiber and fixed to a tube base having a plurality of fitting portions made along its cylindrical outer circumference, an optical connector housing having a hollow section for accepting the insertion of the ferrule body and having one or more projecting portions and a coupling portion formed at its inner circumferential surface to engage with the fitting portions, a spring fitted over the outer circumference of the tube base, and a holder having a step portion formed in the hollow section for supporting one end portion of the spring and further having a coupling portion at its outer circumferential surface. In this structure, the ferrule body is inserted into the optical connector housing so that the tip portion of the ferrule body protrudes from the optical connector housing and the fitting portions are engaged and locked with the projecting portions to inhibit the rotation of the ferrule body, and further the spring is inserted onto the tube base and the coupling portion on the outer circumferential surface of the holder is engaged with the coupling portion on the inner circumferential surface of the optical connector housing while a portion of the tube base accommodating the spring is housed into the hollow section of the holder so that due to the reacting force of the spring a biasing force is given to the ferrule body in the protruding direction to form an optical connector assembly. In this case, the axial length of the fitting portion of the tube base is set to be shorter than the separation between an end surface of the projecting portion of the optical connector housing and an end surface of the holder.

The fitting portions formed on the outer circumferential surface of the tube base can be four in number and arranged at an interval of 90 degrees, whereas the projecting portions of the optical connector housing can be 2 in number and locked with notch portions between the fitting portions.

Moreover, in accordance with the present invention, there is provided an optical connector aligning method in which the optical connector assemblies each thus constructed are set to both sides of an adapter housing and the ferrule body of the optical connector is rotated with reference to the key attached to the optical connector housing in order to minimize the optical loss resulting from the fiber coupling, wherein the ferrule body is pressed against the reacting force of the spring to release the engagement of the fitting portions of the ferrule body with the projecting portions, and the fitting portions of the ferrule body are rotated between the end surfaces of the projecting portions of the optical connector housing and the end surface of the holder, and subsequently the ferrule body is released from the pressing to make the fitting portions again engage with the projecting portions at that rotated position, thus minimizing the difference in position between the optical axes of the optical connectors mounted in the adapter housing.

For the alignment the ferrule body can be rotated successively by 90 degrees.

The object and features of the present invention will become more readily apparent from the following detailed description of the preferred embodiments taken in conjunction with the accompanying drawings.

DETAILED DESCRIPTION OF THE PREFERRED EMBODIMENT

A detailed description will be made hereinbelow of an embodiment of the present invention with reference to the drawings.

Figure 1A:
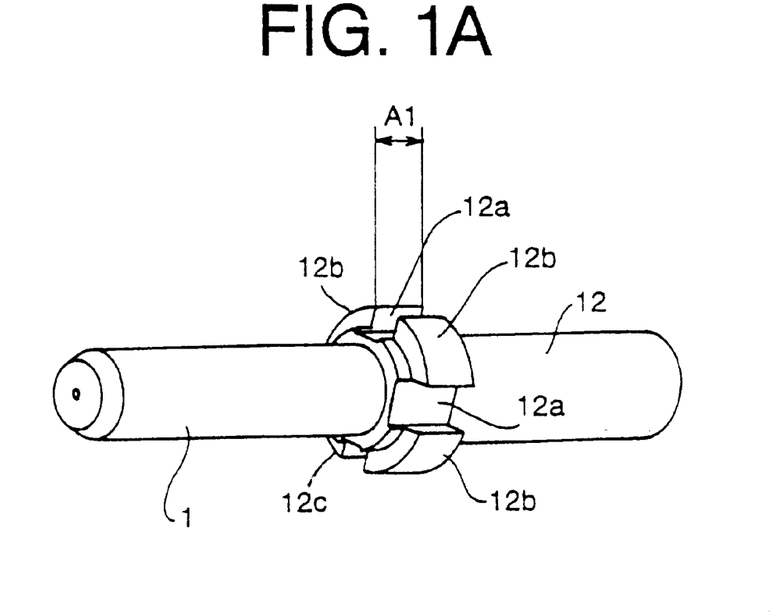
FIG. 1A is a perspective view showing a ferrule body and a tube base in order to illustrate a structure of an optical connector according to an embodiment of the present invention.
Figure 1B:
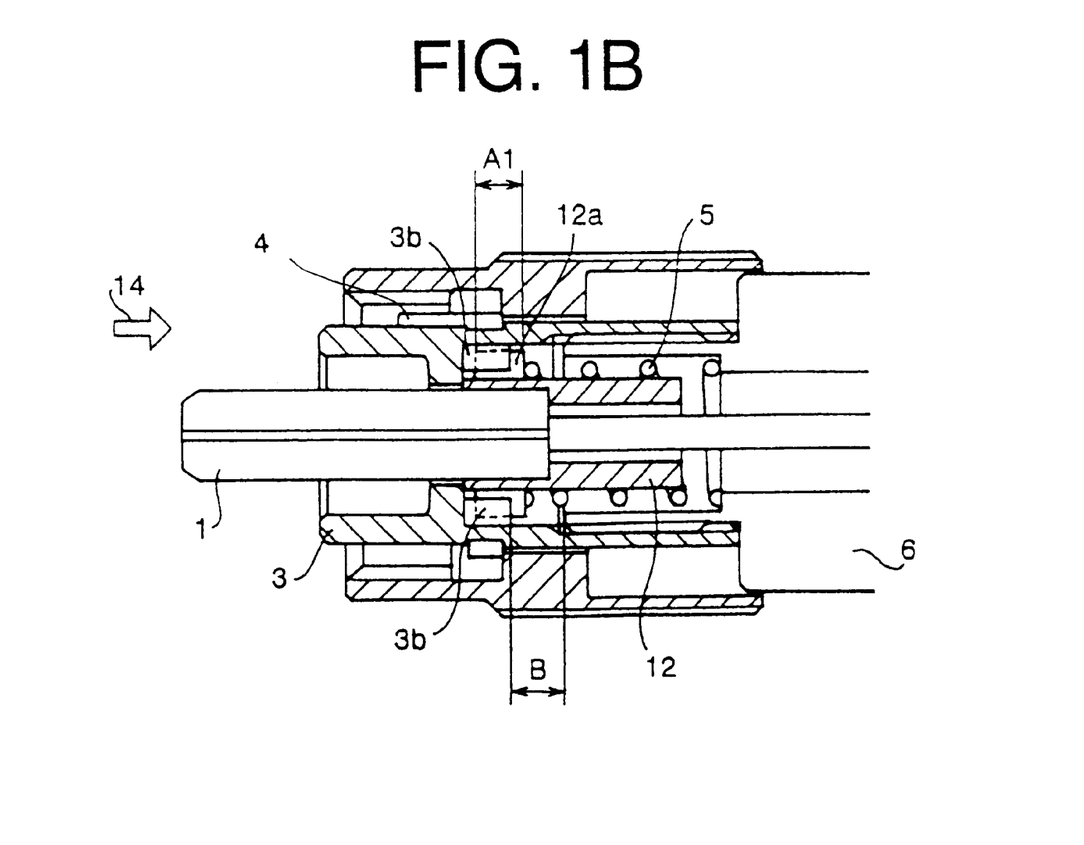
FIG. 1B is a cross-sectional view showing an optical connector assembly according to this embodiment.

FIGS. 1A and 1B are illustrations useful for describing a structure of an optical connector according to an embodiment of the this invention, FIG. 1A being a perspective view showing a ferrule body and a tube base section and FIG. 1B being a cross-sectional view showing an optical connector assembly.

The construction of an optical connector is the same structure as in FIG. 3 except for the construction of a tube base, and therefore, the whole structure of the optical connector shown in FIG. 1B will be omitted from the description.

As shown in FIGS 1A, 1B, 2A and 2B four fitting portions 12b and 12c are formed on an outer circumferential portion of a tube base 12 and four notch portions 12a are defined between the fitting portions.

An axial dimension A1 of the three fitting portions 12b is set to be smaller than a separation or gap B between end portions of projecting portions 3b of an optical connector housing 3 and a tip portion of a holder 6.

Figure 2A:
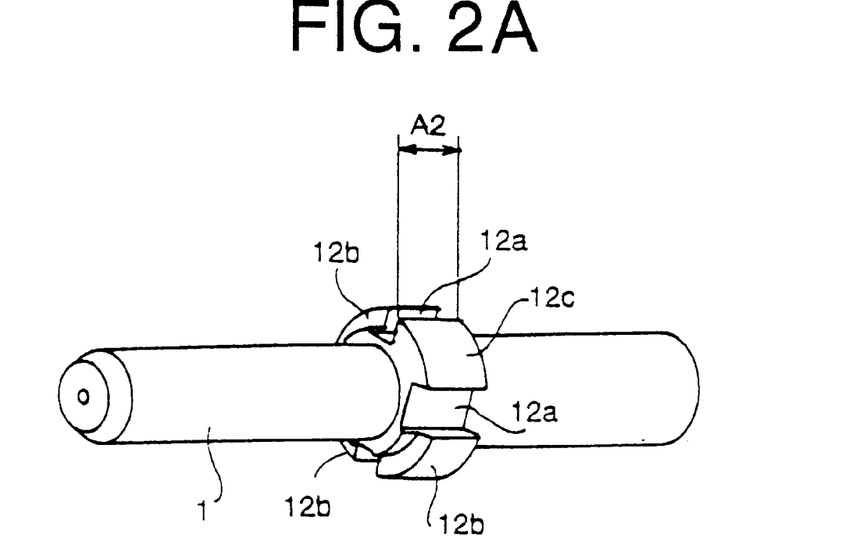
FIG. 2A is a perspective view showing the ferrule body and the tube base viewed from an angle different from that in FIG. 1A in order to illustrate the optical connector structure according to this embodiment of the present invention.

On the other hand, as shown in FIG. 2A, an axial dimension A2 of one fitting portion 12c is set to be larger than the separation B between the end portion of the projecting portion 3b of the optical connector housing 3 and the tip portion of a holder 6.

In a state of an assembled condition of the optical connector, a ferrule body 1 protruding from the optical connector housing 3 is pressed and shifted against a reacting force of a spring 5 thereinto in a direction indicated by an arrow 14, so that the fitting portions 12b are inserted up to the gap B between the end portions of the projecting portions 3b formed on the optical connector housing 3 and the tip portion of the holder 6. Whereupon, the fitting portions 12b are released from the engaging and locking relation to the projecting portions 3b.

In this state, the ferrule body 1 is rotatable with reference to a key 4 mounted on the optical connector housing 3.

Thus, the ferrule body 1 is rotated so that its rotational position is determined to provide desired optical characteristics, that is, to minimize the optical loss, at which position the ferrule body 1 is released from the pressing. Accordingly, the fitting portions 12b of the tube base 12 and the projecting portions 3b of the optical connector housing 3 are again engaged with each other at this rotational position.

Figure 2B:
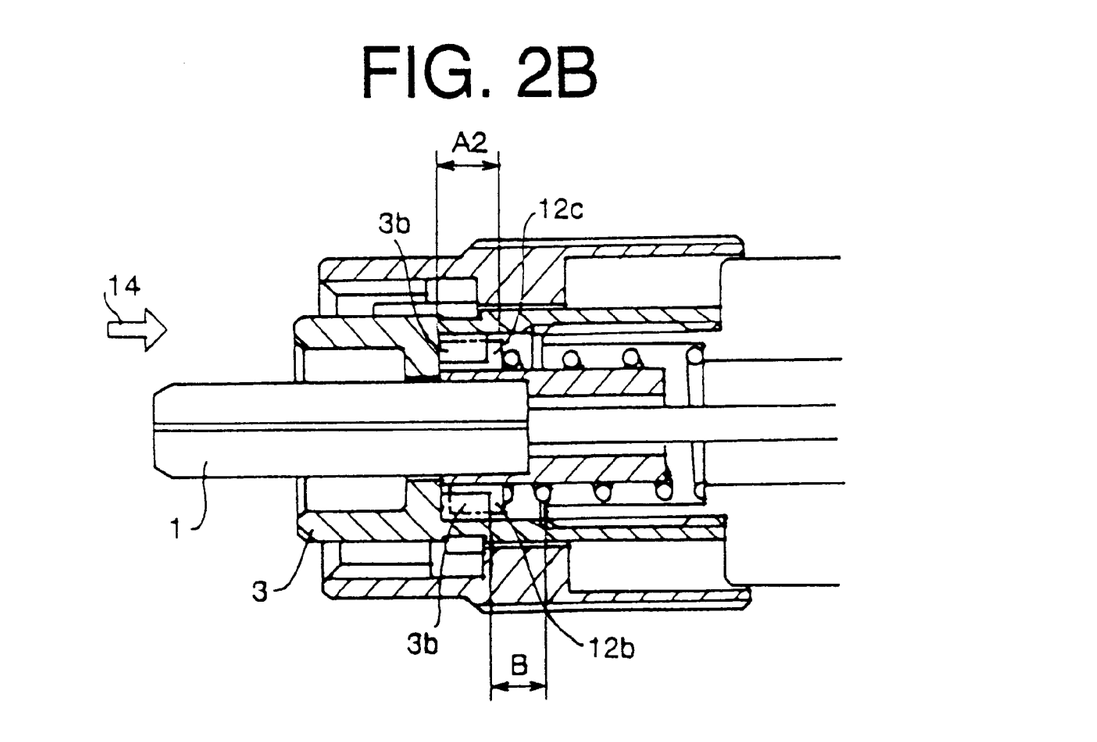
FIG. 2B is a cross-sectional view showing the optical connector assembly in which the ferrule body is inserted so that a fitting portion 12c appears at the front side.

FIG. 2B is a cross-sectional view showing an optical connector assembly in which the ferrule body 1 is inserted so that the fitting portion 12c appears at the front side.

When providing desired optical characteristics by the rotation of the ferrule body 1, since the axial dimension A2 of the fitting portion 12c is larger than the separation B between the end portions of the projecting portions 3b of the optical connector housing 3 and the tip portion of the holder 6, a portion of the side surface of the fitting portion 12c comes into contact with a side surface of the projecting portion 3b, so that at the alignment the ferrule body 1 is limited in rotation so as not to exceed 360 degrees.

In this embodiment, although for the alignment the ferrule body 1 is rotated successively by 90 degrees, the minimum rotational angle can be varied, for example, to 45 degrees by changing the numbers of fitting portions and notch portions.

Furthermore, in this embodiment, although the screw thread 3e is used as the coupling portion on the inner circumferential surface of the optical connector housing 3 while the screw thread 6e is employed as the coupling portion on the outer circumferential surface of the holder 6 and both are engaged with each other for connection, the coupling portions are not limited to the screws, and it is also possible to use an SC connector in which a slit is made and they are fixedly joined to each other through a C washer.

As described above, according to this invention, the ferrule body is inserted into the optical connector housing and the fitting portions are engaged and locked with the projecting portions in a state where the tip portion of the ferrule body protrudes from the optical connector housing to inhibit the rotation of the ferrule body. Further, the spring is fitted over the tube base and the coupling portion on the outer circumferential surface of the holder is engaged with the coupling portion on the inner circumferential surface of the optical connector housing while the tube base section to which the spring is set is accommodated, so that owing to the reacting force of the spring a biasing force is given to the ferrule body in the protruding direction, and the axial length of the fitting portion of the tube base is set to be shorter than the separation between the end surface of the projecting portion of the optical connector housing and the end surface of the holder.

Thus, the ferrule body can be rotated with reference to the key on the optical connector housing in a state of being pressed to be inserted and, by releasing it from the pressing, the fitting portions of the tube base can again be engaged with the projecting portions of the optical connector housing at that rotational position, which allows easy alignment without disassembling the optical connector assembly.

Accordingly, it is possible to omit the troublesome works including the alignment based upon the repeated disassembly and attachment, and to solve the conventional problem that the alignment and assembling are done at the installation location.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. A structure of an optical connector comprising:

a ferrule body fixedly secured to a tube base having a plurality of fitting portions formed along its cylindrical outer circumference and having a small hole into which an optical fiber is inserted;

an optical connector housing having a hollow section with an inner circumferential surface into which said ferrule body is inserted, and further having, on the inner circumferential surface, at least one projecting portion engaged with said fitting portions, and a screw, further wherein said projecting portion has an end surface;

a spring fitted over said outer circumference of said tube base; and a holder having a hollow section in which a step portion is formed to come into contact with and support one end portion of said spring, and further having a screw at its outer circumferential surface, said holder further having an end surface;

wherein said ferrule body is inserted into said optical connector housing so that a tip portion of said ferrule body protrudes from said optical connector housing and said fitting portions are engaged and locked with said projecting portions to inhibit rotation of said ferrule body, said spring is fitted over said tube base, and said screw thread of said outer circumferential surface of said holder is engaged with said screw thread of said inner circumferential surface of said optical connector housing while a portion of said tube base accommodating said spring is inserted in said hollow section of said holder, so that owing to a reacting force of said spring a biasing force is given to said ferrule body in the protruding direction to form an optical connector assembly, and an axial length of one of said plurality of fitting portions formed on said outer circumferential surface of said tube base is longer than an axial length of said fitting portion of the other portion of said tube base which is set to be shorter than said separation between said end surface of said projecting portion of said optical connector housing and said end surface of said holder.

2. A structure of an optical connector as defined in claim 1, wherein a housing cover is rotatably placed on said optical connector housing, and a screw thread provided on an inner circumferential surface of said housing cover is engaged with a screw thread provided on an outer circumferential surface of an adapter housing to mount and fix said optical connector on and to said adapter housing.

3. A structure of an optical connector as defined in claim 1, wherein said fitting portions are four in number and said four fitting portions are formed on said outer circumferential surface of said tube base at an interval of 90 degrees, whereas said projecting portions of said optical connector housing are two in number, with said projecting portions being locked with notch portions defined between said fitting portions.

4. An optical connector aligning method in which a ferrule body of said optical connector is rotated with reference to a key attached onto said optical connector housing to minimize an optical loss resulting from an optical coupling, said method comprising the steps of:

pressing said ferrule body against a biasing force of said spring to release fitting portions of said ferrule body from the engagement with projecting portions of a housing of said optical connector;

rotating said fitting portions of said ferrule body between an end surface of said projecting portion of said optical connector housing and an end surface of a holder; and releasing said ferrule body from the pressing so that the engagement of said fitting portions of said ferrule body with said projecting portions is again established to minimize a difference between optical axes of said optical connectors which are mounted onto an adapter housing.

5. An optical connector aligning method as defined in claim 4, wherein the rotation of said ferrule body for the alignment is made by 90 degrees.

6. An improved tube base comprising:

a tube base having a plurality of fitting portions formed along its cylindrical outer circumference; and a ferrule body fixedly secured to said tube base, said ferule body having a small hole for accepting and holding an optical fiber;

wherein between each pair of said fitting portions there is formed a notch portion;

said fitting portions having an axial length; and the axial length of one of said fitting portions is larger than the axial length of the remaining fitting portions.

7. The improved tube base according to claim 6, further comprising a spring fitted over said outer circumference of said tube base.

8. An optical connector comprising:

a tube base having a plurality of fitting portions formed along its cylindrical outer circumference;

a ferrule body fixedly secured to said tube base, said ferrule body having a small hole for accepting and holding an optical fiber and a tip portion;

wherein between each pair of said fitting portions there is formed a notch portion;

said fitting portions having an axial length, the axial length of one of said fitting portions is larger than the axial length of the remaining fitting portions;

a spring fitted over said outer circumference of said tube base, said spring having an end portion;

a housing, having an inner circumferential surface forming a hollow section into which said tube base is inserted, said inner circumferential surface having at least two projecting portions for engaging said fitting portions of said tube base, said inner circumferential surface further having a screw thread formed thereon; and a holder having a hollow section in which a step portion is formed, said step portion contacting and supporting said spring when said tube base is inserted into said housing;

said holder further having an outer circumferential surface, said outer circumferential surface of said holder having a screw thread formed thereon;

wherein the tip portion of said ferrule body protrudes from said housing; and wherein, further, said screw thread of said outer circumferential surface of said holder is engaged with said screw thread of said inner circumferential surface of said housing while a portion of said tube base accommodating said spring is inserted into said hollow section of said holder and wherein further due to a reacting force of said spring with said step portion of said hollow section of said holder a biasing force is created whereby said tube base is engaged in said hollow section of said holder.

9. The optical connector according to claim 8, further comprising:

a housing cover, having an inner circumferential surface, said inner circumferential surface having a screw thread formed thereon, said housing cover being rotatably placed on said housing; and said screw thread formed on said inner circumferential surface of said housing cover engaging said screw thread formed on said outer circumferential surface of said housing, thereby attaching said housing cover to said housing.

10. The optical connector according to claim 8, wherein there are four fitting portions formed on said tube base.

11. The optical connector according to claim 10, wherein said fitting portions are formed on said outer circumferential surface of said tube base at an interval of ninety degrees.

12. The optical connector according to claim 11, wherein there are two projecting portions formed on said inner circumferential surface of said housing.

13. The optical connector according to claim 12, wherein said projecting portions of said housing are engaged with said notch portions of said tube base.

14. An optical connector aligning method comprising the steps of: pressing a ferrule body attached to a tube base against a biasing force of a spring fitted over said tube base to release a plurality of notch portions of said tube base from engagement with a plurality of projecting portions of a housing; rotating a plurality of fitting portions of said tube base between an end surface of said projecting portions of said housing and an end surface of a holder of said optical connector until an optical loss resulting from an optical coupling is minimized; and releasing said tube base from pressing in order to re-establish an engagement between said plurality of notch portions of said tube base with said projecting portions of said housing.

15. The optical connector aligning method according to claim 14, wherein the rotating step is performed in increments of ninety degrees.

* * * * *